United States Patent [19]

Turner

[11] 4,391,229

[45] Jul. 5, 1983

[54] STEAM INJECTION APPARATUS

[76] Inventor: Larry G. Turner, 1005 Vine St., Collinsville, Ill. 62234

[21] Appl. No.: 220,739

[22] Filed: Dec. 29, 1980

[51] Int. Cl.³ .............................................. F02D 19/00
[52] U.S. Cl. ................................ 123/25 B; 123/25 P; 123/25 L
[58] Field of Search .................. 123/25 P, 25 B, 25 E, 123/25 L, 25 C, 25 D

[56] References Cited

U.S. PATENT DOCUMENTS

| | | | |
|---|---|---|---|
| 1,547,985 | 7/1925 | Wein | 123/25 B |
| 1,848,455 | 3/1932 | Bashford | 123/25 B |
| 1,879,557 | 9/1932 | Skreen | 123/25 B |
| 4,078,527 | 3/1978 | Yasuda | 123/25 B |
| 4,183,338 | 1/1980 | Lindberg | 123/25 E |

Primary Examiner—Ira S. Lazarus
Attorney, Agent, or Firm—Cohn, Powell & Hind

[57] ABSTRACT

A steam injection apparatus for an internal combustion engine having an exhaust system, a carburetor and an engine vacuum line, the apparatus including a reservoir of liquid water, a conduit communicating with the reservoir and a heater coil of metallic tubing. The heater coil has an inlet which communicates with the conduit and an outlet which communicates with the vacuum line. The coil is placed in heat-receiving relation to the engine exhaust system for heating water in the coil. The coil has a cross-section that is insufficient to allow complete vaporization of the water in the coil, and the water is substantially vaporized within the vacuum line for introduction into the engine in a vaporized state. An air inlet is connected to the conduit at a tee fitting for mixing air with water from the reservoir for regulating flow to the heater coil. A threaded member is placed within resilient tubing, and provides an air passage through its threads and restricts air flow through the tubing. A clamp compresses the resilient tubing about the threaded member for regulating flow through the air passage. The coil is flexibly shapeable to provide contours for substantial heat transfer contact with the exhaust system.

4 Claims, 4 Drawing Figures

STEAM INJECTION APPARATUS

BACKGROUND OF THE INVENTION

This invention relates in general to a device for injecting water into an internal combustion engine, and particularly to a device in which water is introduced into an engine.

Devices for injecting steam into an internal combustion engine generally include a boiler for vaporizing liquid water. However, when water is vaporized within a boiler, the vapor pressure present precludes the use of a simple system for feeding liquid water to the boiler. In order to provide for the feeding of water, prior art devices pressurize the water container or provide pumps for pumping water to the boiler. The known boilers include units which are connected directly in the engine exhaust or cooling systems, and include devices of fixed dimensions which are not readily adaptable to variations in automobile engine exhaust system arrangements. Controls for various known systems include complicated pressure-actuated and check valves, restricted orifices and valves directly connected to carburetor throttle valves.

SUMMARY OF THE INVENTION

This vapor injection apparatus for an internal combustion engine includes a coil heater which is readily adaptable to various engine arrangement, and which does not completely vaporize water within the carburetor. The water is partially vaporized in the coil heater. However, much of the water within the coil heater remains in a liquid state with pockets of steam interspersed with the liquid water. Because much of the water remains liquid, a high pressure is not present in the coil heater, and a pressurized water supply or pump is not necessary for feeding water to the coil heater. The apparatus further includes metering means for metering air flow with the flow of water for controlling the amount of water vapor injected into the engine.

The steam injection apparatus includes a reservoir of liquid water with conduit means communicating between the reservoir and heater means. The heater means includes a coil of metallic tubing having an inlet which communicates with the conduit means, and an outlet which communicates with the engine intake manifold through a vacuum hose attached to a vacuum port which is often located near the carburetor base. The coil is placed in heat-receiving relation to the engine exhaust system for heating water in the coil.

In one aspect of the invention, the coil of tubing has an interior cross-section which is insufficient to allow complete vaporization of the water within the coil. Pockets of steam are interspersed with hot liquid water in the coil. The water is substantially vaporized within the vacuum hose attached to the intake manifold vacuum port on the carburetor for introduction into the engine in a vaporized state.

In another aspect of the invention, metering means includes an air inlet connected to the conduit means for mixing air with water from the reservoir to regulate water flow to the heater means. In yet another aspect, the metering means includes a resilient tube at the air inlet, and a threaded member placed within the resilient tubing for providing an air passage through its threads and restricting airflow through the air inlet. In still another aspect, means selectively compress the resilient tubing about the threaded member for regulating flow through the air passage. Increased air flow corresponds to decreased water usage, while decreased air flow corresponds to increased water usage in the system.

In one aspect of the invention, the metering means includes an additional threaded member in the conduit means for providing a passage through its threads and restricting flow in the conduit means. In one aspect of the invention, the coil is flexibly shapeable to provide contours for substantial heat transfer contact with the exhaust system. In another aspect, the coil of tubing has a generally longitudinal axis with two ends. The coil of tubing includes a plurality of sections running generally adjacent to each other and curved back around at the ends. In still another aspect of the invention, the coil of tubing has a cross-section less than the carburetor vacuum hose with which the coil of tubing communicates.

In one aspect of the invention, the air inlet is located higher than the bottom of the carburetor, and the reservoir is located below the bottom of the carburetor. The air inlet is located at the highest point of the steam injection system and the reservoir is located at the lowest point of the steam injection engine.

Steam is injected in the carburetor of the internal combustion engine by first supplying water to a heating coil and heating the water in the coil. The coil has a cross-section insufficient to allow complete vaporization of the water, and the heated and partially vaporized water is introduced from the coil into a vacuum line attached to an inlet near the base of the carburetor wherein the water is substantially vaporized prior to its introduction into the intake manifold and engine.

DESCRIPTION OF THE PREFERRED EMBODIMENT

Figure 1:
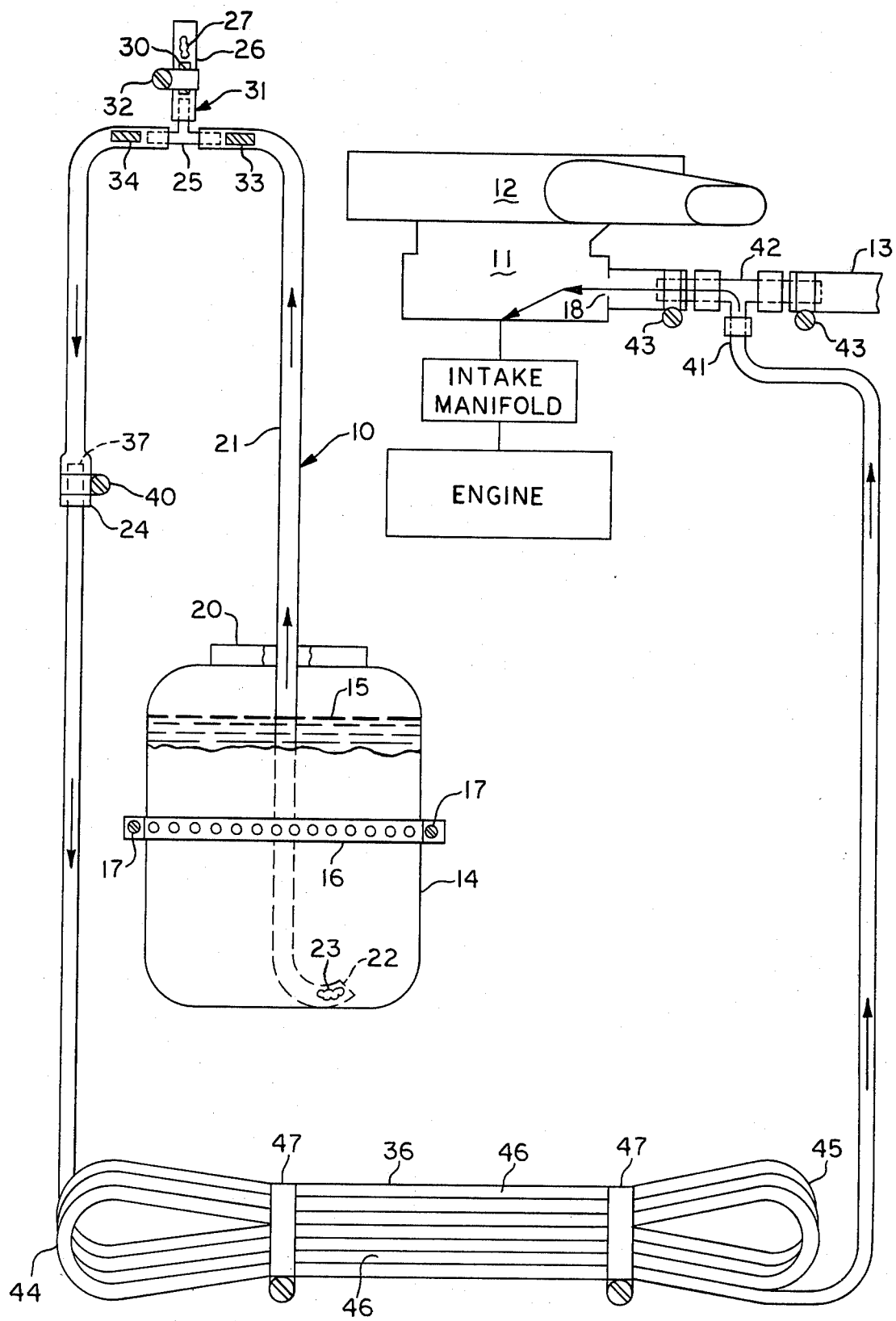
FIG. 1 is an elevational view of the steam injection apparatus for an internal combustion engine.

Referring now by characters of reference to the drawings, and first to FIG. 1, it will be understood that the steam injection system generally indicated by 10 is connected to a carburetor 11 of an internal combustion engine. The carburetor 11 is shown with a conventional air breather system 12 which supplies air to the carburetor 11. The carburetor 11 includes a conventional P.V.C. line 13, which is a vacuum line connected to the intake manifold of the engine through an inlet 18 located on and near the base of the carburetor 11.

The injection system 10 includes a container 14 providing a reservoir for holding water 15. The container 14 is mounted lower than the bottom of the carburetor 11, at the lowest point of the steam injection system 10. Preferably, the water 15 is distilled water which does not contain minerals. A strap 16 and bolts 17 can be used for attachment of the container 14. A cap 20 is provided for closing the container 14. The cap 20 does not seal the container 14, and air from atmosphere can enter the interior of the container 14. A tube 21, providing conduit means, has a first end 22 located within and near the bottom of the container 14. Within the tube 21 at the tube end 22 is filter floss 23 for filtering water 15 flowing through the tube 21.

The tube 21 passes through the cap 20, and has a second end 24. The tee fitting 25 has its opposed branches interposed in the tube 21. Metering means 31 includes an air inlet tube 26 attached to the intervening transverse branch of tee fitting 25. The tee fitting 25 and air inlet tube 26 are mounted above the bottom of the carburetor 11 and preferably above the level of the air breather 12 at the highest point of the steam injection system. The air inlet tube 26 includes filter floss 27 for filtering air passing through the air inlet tube 26.

The metering means 31 includes a set screw 30 constituting a threaded member, within the air intake tube 26, and a compression clamp 32 is mounted about the tube 26 and set screw 30. Set screws 33 and 34, constituting threaded members, are located within the tube 21 upstream and downstream of the opposed branches of the tee fitting 25. In the preferred embodiment, the tube 21 and air intake tube 26 consists of flexible rubber tubing having a 3/16 inch I.D. and a 5/16 inch O.D., and the set screws 30, 33 and 34 are 10-24 by ½ inch stainless steel set screws.

A coil of metallic tubing includes an inlet 37 attached to the tube 21 such as by a clamp 40. An outlet 41 of the coil 36 is attached to a second tee fitting 42 which is located in the P.V.C. line 13 and retained by clamps 43.

The coil 36 has a generally longitudinal axis with two ends 44 and 45, and includes a plurality of sections 46 running generally adjacent to each other and curved back around at the ends 44 and 45. Clamps 47 are provided for attachment of the coil 36 to the engine exhaust system.

Figure 2:
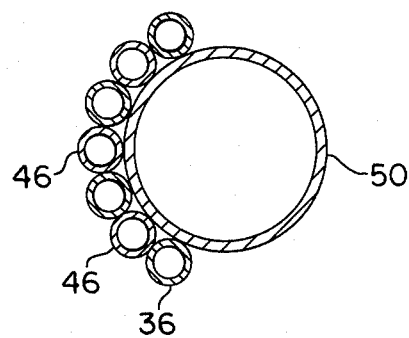
FIG. 2 is a cross-sectional view of the coil attached to an exhaust pipe.
Figure 3:
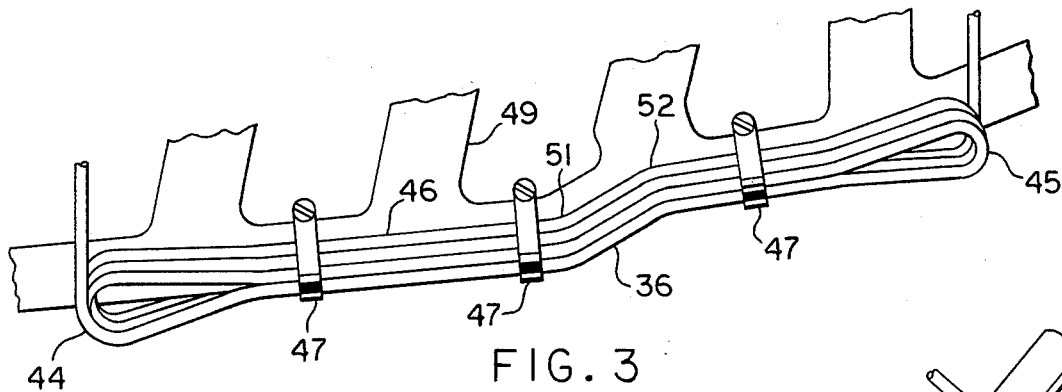
FIG. 3 is a fragmentary elevational view of a coil which has been shaped to fit a particular manifold.

The coil 36 is flexibly shapeable to provide substantial heat transfer contact with an exhaust system. FIG. 2 shows the coil 36 fitted about the cross-section of an exhaust pipe 50. FIG. 3 shows a coil 36 in which bends at 51 and 52 provide the contours conforming to the shape of a manifold portion 49. The coil 36 of FIG. 4 includes bend 53 conforming to the shape of an exhaust pipe 54. In the preferred embodiment, the coil 36 consists of 12⅓ feet of ¼ inch O.D. and 3/16 inch I.D. copper tubing.

It is though that the structural features and functional advantages of the steam injection apparatus have become fully apparent from the foregoing description of parts, but for completeness of disclosure a brief description of the operation of the apparatus will be given.

The water vapor injection system 10 relies upon the vacuum present in the engine for drawing water 15 from the container 14 through the coil 36 and into the P.V.C. line 13 for introduction into the engine. It is desirable to inject approximately one part water to forty parts gasoline in the engine. Regulation of the water injection is accomplished by selectively loosening or tightening the clamp 32 which controls air flow through the air inlet 27.

Generally, a higher carburetor vacuum requires a lesser restriction for greater air flow. When the vacuum is less, then a greater restriction for less air flow is required. The adjustment for proper ratio of gasoline to water is accomplished by careful measurement of gasoline usage and water usage, and by adjustment of the clamp 32 until the proper ratio has been achieved.

The container 14 is mounted below the bottom of the carburetor in order to prevent gravity flow of water 15 from the container 14 to the carburetor 11. Such gravity flow could damage the engine to which the carburetor 11 is attached.

Figure 4:
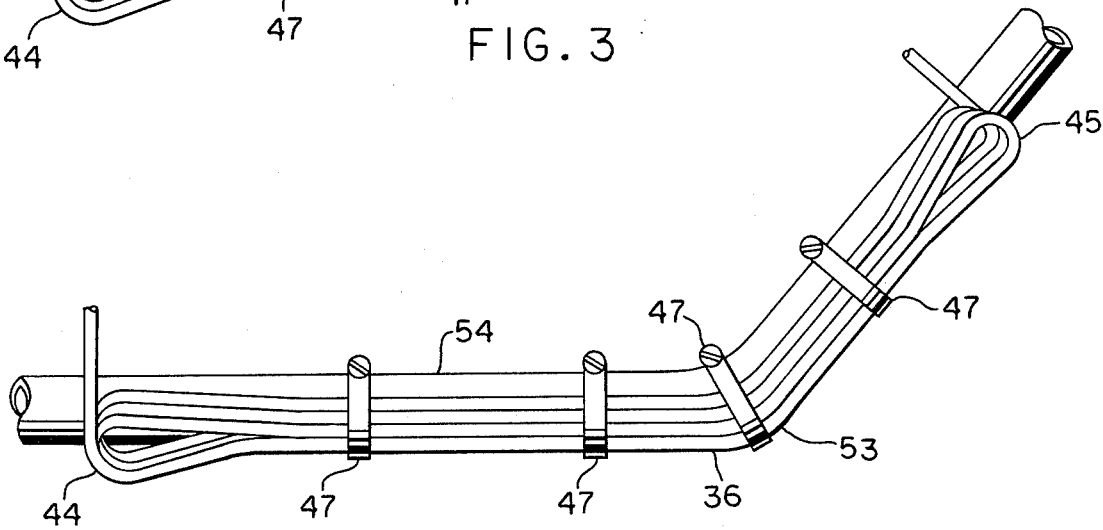
FIG. 4 is an elevational view of a coil which is attached to an exhaust pipe.

The coil 36 is positioned against and clamped to the engine exhaust system, such as the exhaust pipe 54 shown in FIG. 4, for providing heat transfer from the pipe 54 to the coil 36 and the water flowing within the coil 36.

The coil 36 is sufficiently flexible so that on installation it can be shaped to provide substantial heat transfer contact with an engine exhaust component. The coil 36 can be shaped around a pipe 50 as in FIG. 2. The coil 36 can be bent as in FIGS. 3 and 4 to provide contours for following a manifold 49 or an exhaust pipe 54. Because the coil 36 has a unique flexible formation, it can be adapted to a great variety of shapes.

It will be understood that in the preferred embodiment, there is insufficient vacuum in the coil 36, because the cross-section of the coil 36 is insufficient, to allow complete vaporization of the water within the coil 36. The water therefore passes in a liquid phase with pockets of steam interspersed with the liquid water into the P.V.C. line 13. The P.V.C. line 13 has a greater cross-sectional area than the coil 36, and a greater vacuum is present. The liquid water is substantially vaporized within the P.V.C. line 13, and the vaporized water is then drawn into the engine where it is mixed with the fuel from the carburetor 11. This water and fuel mixture when burned in the engine promotes cleaner running of an internal combustion engine to which it is attached and helps to improve gasoline mileage in an automobile engine.

I claim as my invention:

1. A steam injection apparatus for an internal combustion engine having an exhaust system, and a vacuum line communicating with the engine, comprising:
    (a) a reservoir of liquid water,
    (b) conduit means communicating with the reservoir,
    (c) heater means, including a coil of metallic tubing having an inlet communicating with the conduit means, and an outlet communicating with the vacuum line, the coil being placed in heat-receiving relation to the engine exhaust system for heating water in the coil, and
    (d) metering means including an air inlet connected in the conduit means for mixing air with water from the reservoir, and means carried by the air inlet for selectively controlling the amount of air entering the conduit means at a predetermined engine vacuum and thereby solely and selectively regulating the amount of water flow through the conduit means.

2. A steam injection apparatus as defined in claim 1, in which:
    (e) the means carried by the air inlet includes:
        1. a resilient tubing at the air inlet,
        2. a threaded member placed within and engaging the resilient tubing for providing an elongate restricted air passage through its threads, and
        3. clamping means selectively compressing the resilient tubing about the threaded member for regulating air flow through the elongate restricted air passage, and thereby solely and selectively regulating the amount of water flow through the conduit means.

3. A steam injection apparatus as defined in claim 1, in which:
    (e) the metering means includes:

1. a tee-fitting having opposed portions disposed in and interconnecting the conduit means, and having an intermediate portion constituting the air inlet,
2. a threaded member placed within and engaging the conduit means upstream of one connected fitting portion for providing an elongate restricted water passage through its threads,
3. a threaded member placed within and engaging the conduit means downstream of the other connected fitting portion for providing an elongate restricted air and water passage through its threads, and (f) the means carried by the air inlet includes:
1. A resilient tubing connected to the intermediate fitting portion,
2. a threaded member placed within and engaging the resilient tubing for providing an elongate restricted air passage through its threads, and
3. clamping means selectively compressing the resilient tubing about the threaded member in the tubing for regulating air flow through the elongate restricted air passage, and thereby solely and selectively regulating the amount of water flow through the conduit means.

4. A steam injection apparatus as defined in claim 1, in which:
(e) the coil has a generally longitudinal axis with opposite ends, the coil running back and forth between the ends to provide a plurality of elongate tubing sections generally laterally adjacent each other between the ends, and reversely curved ends, the elongate tubing sections being flexibly shapeable and conformable to engage the contours of a portion of the engine exhaust system.

* * * * *